(12) United States Patent
Breidenstein

(10) Patent No.: US 7,552,944 B1
(45) Date of Patent: Jun. 30, 2009

(54) VEHICLE BALLAST SYSTEM

(75) Inventor: Dennis M. Breidenstein, Lansing, MI (US)

(73) Assignee: Chaden L.L.C., Lansing, MI (US)

( * ) Notice: Subject to any disclaimer, the term of this patent is extended or adjusted under 35 U.S.C. 154(b) by 374 days.

(21) Appl. No.: 11/461,067

(22) Filed: Jul. 31, 2006

(51) Int. Cl.
*B60R 9/00* (2006.01)

(52) U.S. Cl. .................. 280/759; 280/757; 296/37.6

(58) Field of Classification Search .............. 280/759, 280/757; 296/37.6, 39.2
See application file for complete search history.

(56) References Cited

U.S. PATENT DOCUMENTS

| | | | |
|---|---|---|---|
| 4,632,446 A * | 12/1986 | Douglass | 296/37.6 |
| 4,796,914 A | 1/1989 | Raynor | |
| 4,815,623 A * | 3/1989 | Levin | 220/17.1 |
| 4,902,038 A * | 2/1990 | Grover | 280/759 |
| 4,943,194 A * | 7/1990 | Aguilar | 410/132 |
| 4,971,356 A | 11/1990 | Cook | |
| 5,080,418 A | 1/1992 | Semple et al. | |
| 5,172,953 A | 12/1992 | Chamberlain | |
| 5,330,227 A | 7/1994 | Anderson | |
| 5,494,315 A | 2/1996 | Heltenburg | |
| 5,605,264 A * | 2/1997 | Neal | 224/404 |
| 5,657,916 A | 8/1997 | Tackett | |
| 5,848,744 A * | 12/1998 | Dischner et al. | 224/404 |
| 5,897,138 A | 4/1999 | Hall | |
| 5,927,783 A * | 7/1999 | Baka | 296/37.6 |
| 5,941,565 A | 8/1999 | Clendenin, Jr. | |
| 6,012,872 A * | 1/2000 | Perry et al. | 405/114 |
| 6,027,139 A | 2/2000 | Malinowski, Jr. et al. | |
| 6,079,741 A | 6/2000 | Maver | |
| 6,241,137 B1 * | 6/2001 | Corr | 224/542 |
| 6,283,527 B1 | 9/2001 | Desmarais | |
| 6,302,464 B1 | 10/2001 | Kubis et al. | |
| 6,315,325 B1 * | 11/2001 | Dunn | 280/755 |
| 6,499,434 B1 * | 12/2002 | Tyler | 119/453 |
| 6,514,009 B2 * | 2/2003 | Northcott et al. | 405/53 |
| 6,730,004 B2 * | 5/2004 | Selsam | 482/93 |
| 6,742,825 B1 * | 6/2004 | Macaulay | 296/37.6 |
| 6,848,732 B2 * | 2/2005 | Green | 296/24.33 |
| 2004/0227338 A1 | 11/2004 | Ryan, III et al. | |

FOREIGN PATENT DOCUMENTS

GB 2198119 A * 6/1988
WO WO 9947426 A1 * 9/1999

OTHER PUBLICATIONS

Rubbermaid Roughneck Jumbo Wheeled Storage Box—45 gal; Produced in Jan. 1997.*

* cited by examiner

*Primary Examiner*—John Q. Nguyen
*Assistant Examiner*—Nicole Verley

(57) ABSTRACT

A vehicle ballast system for providing added weight over the wheels of a vehicle for increased traction and to also serve as a storage container. The system also acts as a storage or utility container when the internal bladder is removed. The vehicle ballast system includes a base container, a liner removably positioned within the base container and a bladder unit removably positioned within the liner. The bladder unit includes a nozzle and is able to retain a volume of a liquid substance. The vehicle ballast system also includes a cover that is removably attached to an upper end of the base container.

14 Claims, 13 Drawing Sheets

VEHICLE BALLAST SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to vehicles and more specifically it relates to a vehicle ballast system for providing added weight over the wheels of a vehicle for increased traction and to also serve as a storage container.

2. Description of the Related Art

Any discussion of the prior art throughout the specification should in no way be considered as an admission that such prior art is widely known or forms part of common general knowledge in the field.

Vehicles have been in use for years. Typically, vehicles are driven on a variety of surfaces such as, but not limited to city streets, interstates, highways, and rural roads. When adverse weather conditions arise the need for extra traction is required. This extra traction can come from many different sources (i.e. tire chains, loading the vehicle with sandbags, engaging 4-wheel drive, etc.).

Having extra weight in the cargo area of a vehicle can dramatically affect the vehicles performance while driving. For example when driving from a stopped position or when decreasing vehicle speed the vehicle can respond better by the increased traction. This can reduce the tires from spinning or skidding on slippery surfaces, accumulated by water, ice, snow or mud.

Apparatuses such as sandbags are widely used to increase traction of a vehicle by placing weight over the wheels. One problem with sandbags is that they can be extremely messy as the bags can break open over time. Cleaning up the sand from the sandbags can be a very time consuming project and an overall hassle. Another common device used to increase traction is tire chains. Tire chains can be very difficult to attach to the tires and also are not economical for driving on most surfaces.

There are also weight systems that exist and are built for specific vehicles. These work well for the vehicle that they are built for, but are generally not adequate if you would like to use them on a different style vehicle, as they might not fit the truck bed or cargo area. It can be expensive to buy multiple weight systems for multiple vehicles. A lot of these weight systems are also difficult to install, with some of them even requiring direct fastening to the pickup bed or cargo area with bolts or other permanent fasteners.

While these devices may be suitable for the particular purpose to which they address, they are not as suitable for providing added weight over the wheels of a vehicle for increased traction and to also serve as a storage container. It is often necessary for vehicles to be loaded with extra weight for traction on slippery road conditions. Many of the other systems require time consuming installation, removal and also may have an unnecessary cost in that you must buy different weight systems for different vehicles.

In these respects, the vehicle ballast system according to the present invention substantially departs from the conventional concepts and designs of the prior art, and in so doing provides an apparatus primarily developed for the purpose of providing added weight over the wheels of vehicles for increased traction in winter conditions.

BRIEF SUMMARY OF THE INVENTION

In view of the foregoing disadvantages inherent in the known types of vehicles now present in the prior art, the present invention provides a new vehicle ballast system construction wherein the same can be utilized for providing added weight over the wheels of a vehicle for increased traction and to also serve as a storage container.

The general purpose of the present invention, which will be described subsequently in greater detail, is to provide a new vehicle ballast system that has many of the advantages of the vehicles mentioned heretofore and many novel features that result in a new vehicle ballast system which is not anticipated, rendered obvious, suggested, or even implied by any of the prior art vehicles, either alone or in any combination thereof.

To attain this, the present invention generally comprises a base container, a liner removably positioned within the base container and a bladder unit removably positioned within the liner. The bladder unit includes a nozzle and is able to retain a volume of a liquid substance. The vehicle ballast system also includes a cover that is removably attached to an upper end of the base container.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a vehicle ballast system that will overcome the shortcomings of the prior art devices.

A second object is to provide a vehicle ballast system for providing added weight over the wheels of a vehicle for increased traction and to also serve as a storage container.

Another object is to provide a vehicle ballast system that is adaptable to many types of pickup trucks.

An additional object is to provide a vehicle ballast system that can be easily installed and removed.

A further object is to provide a vehicle ballast system that can function as a storage unit.

Another object is to provide a vehicle ballast system that will not slide around while the vehicle is in motion.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
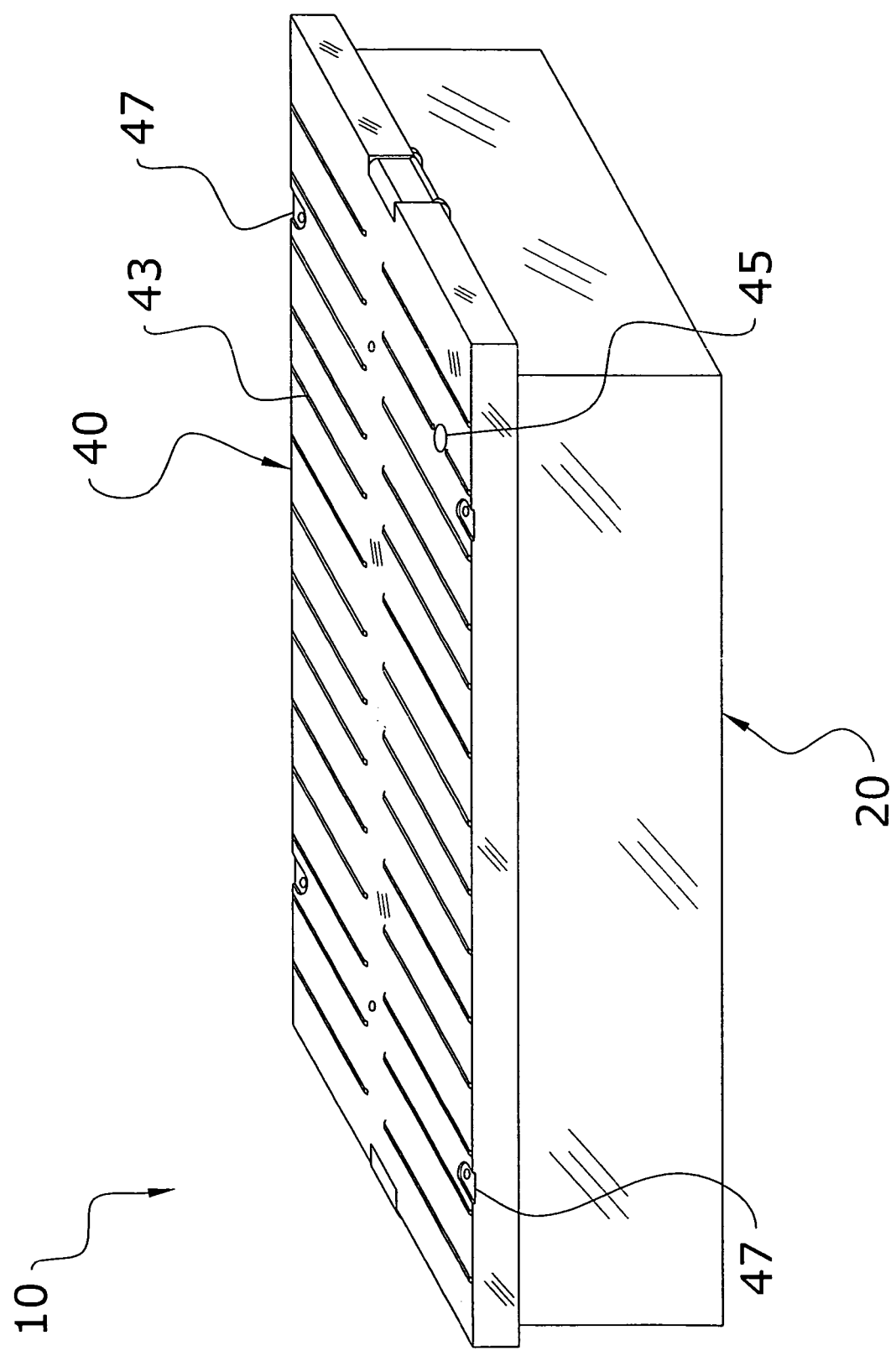
FIG. 1 is an upper perspective view of the present invention.

Turning now descriptively to the drawings, in which similar reference characters denote similar elements throughout the several views, FIGS. 1 through 10 illustrate a vehicle ballast system 10, which comprises a base container 20, a liner 24 removably positioned within the base container 20 and a bladder unit 30 removably positioned within the liner 24. The bladder unit 30 includes a nozzle 32 and is able to retain a volume of a liquid substance 14. The vehicle ballast system 10 also includes a cover 40 that is removably attached to an upper end of the base container 20.

B. Base Container

Figure 2:
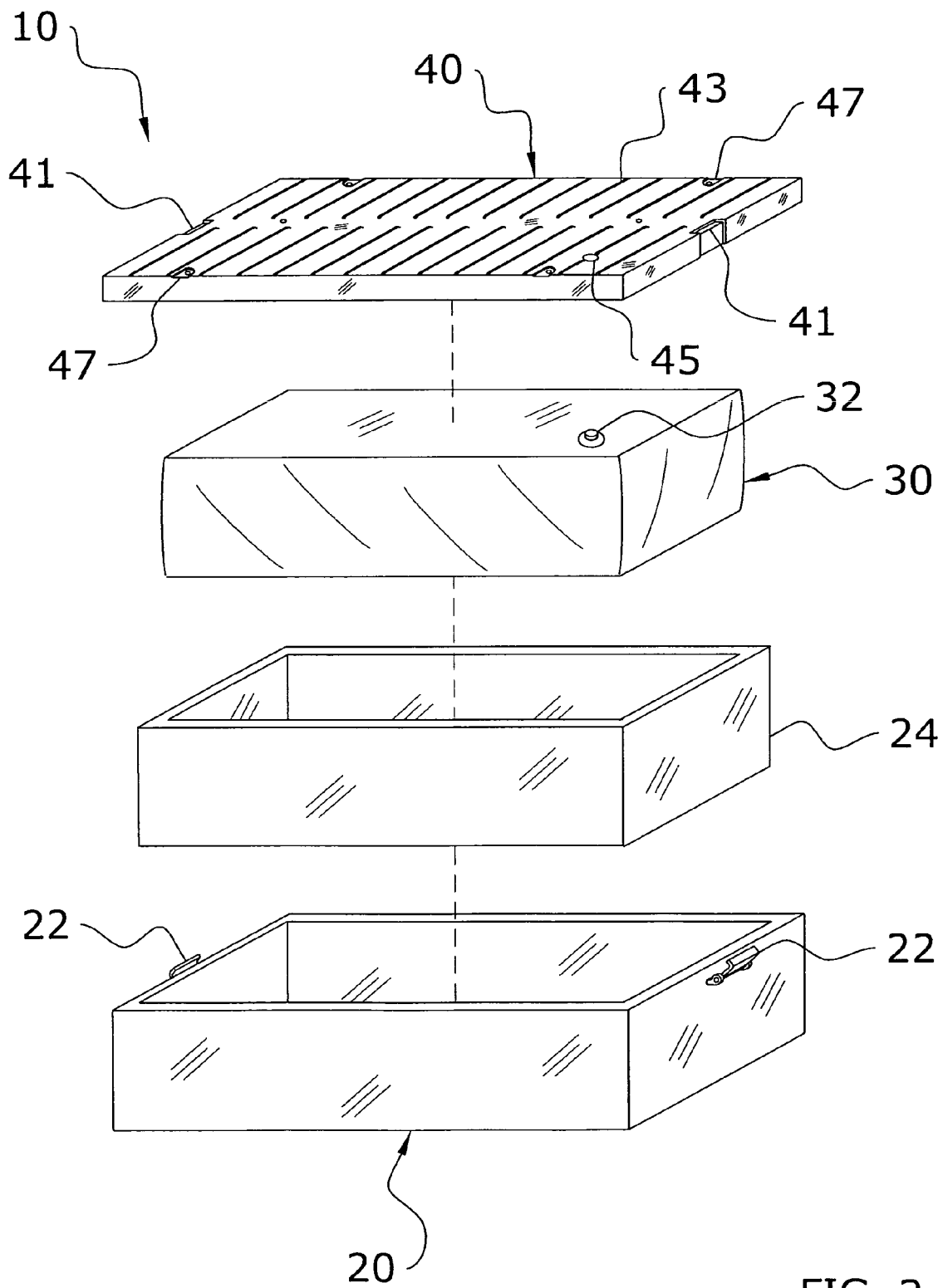
FIG. 2 is an exploded upper perspective view of the present invention.
Figure 3:
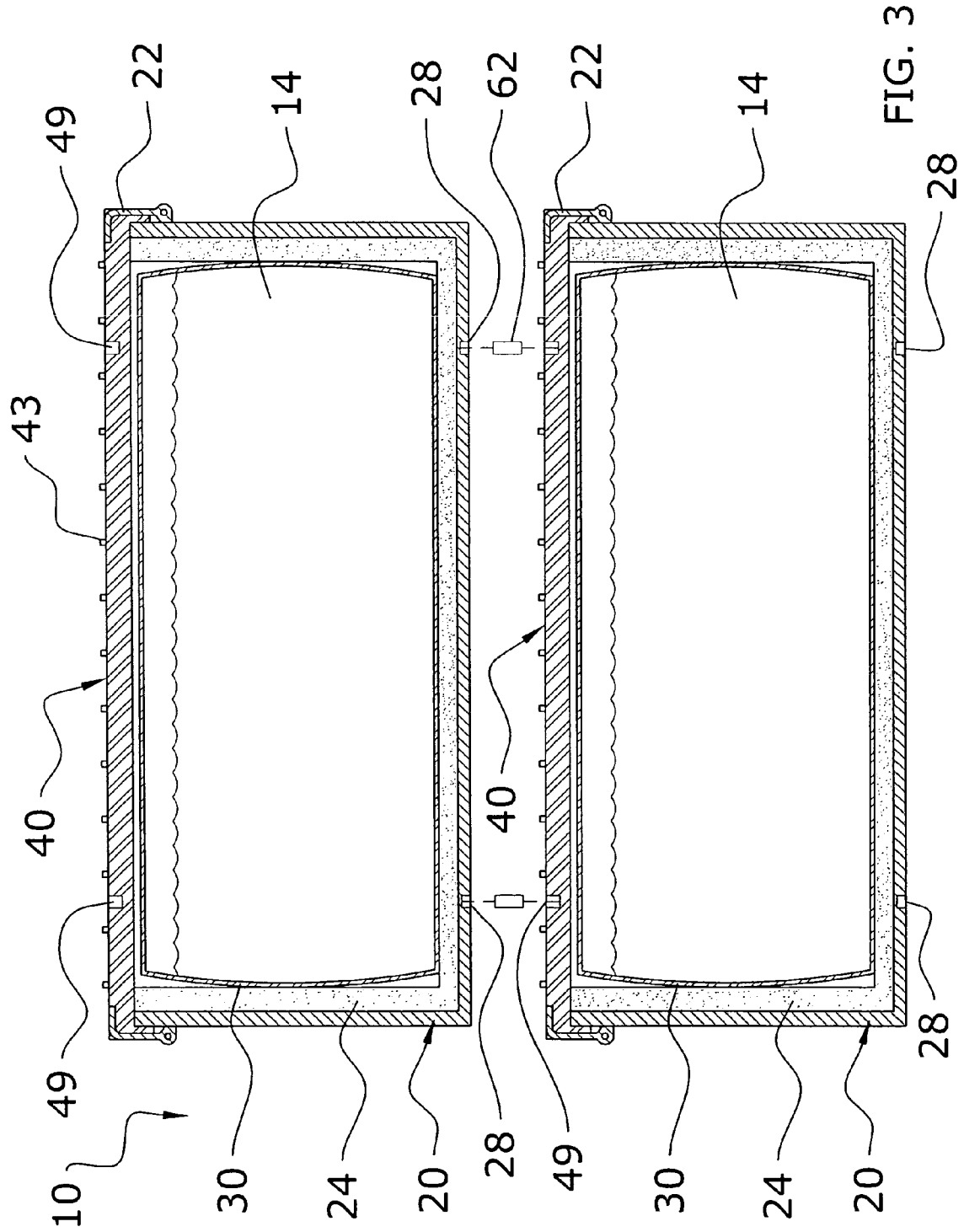
FIG. 3 is an exploded cross sectional view of two present inventions stacked upon one another.
Figure 4:
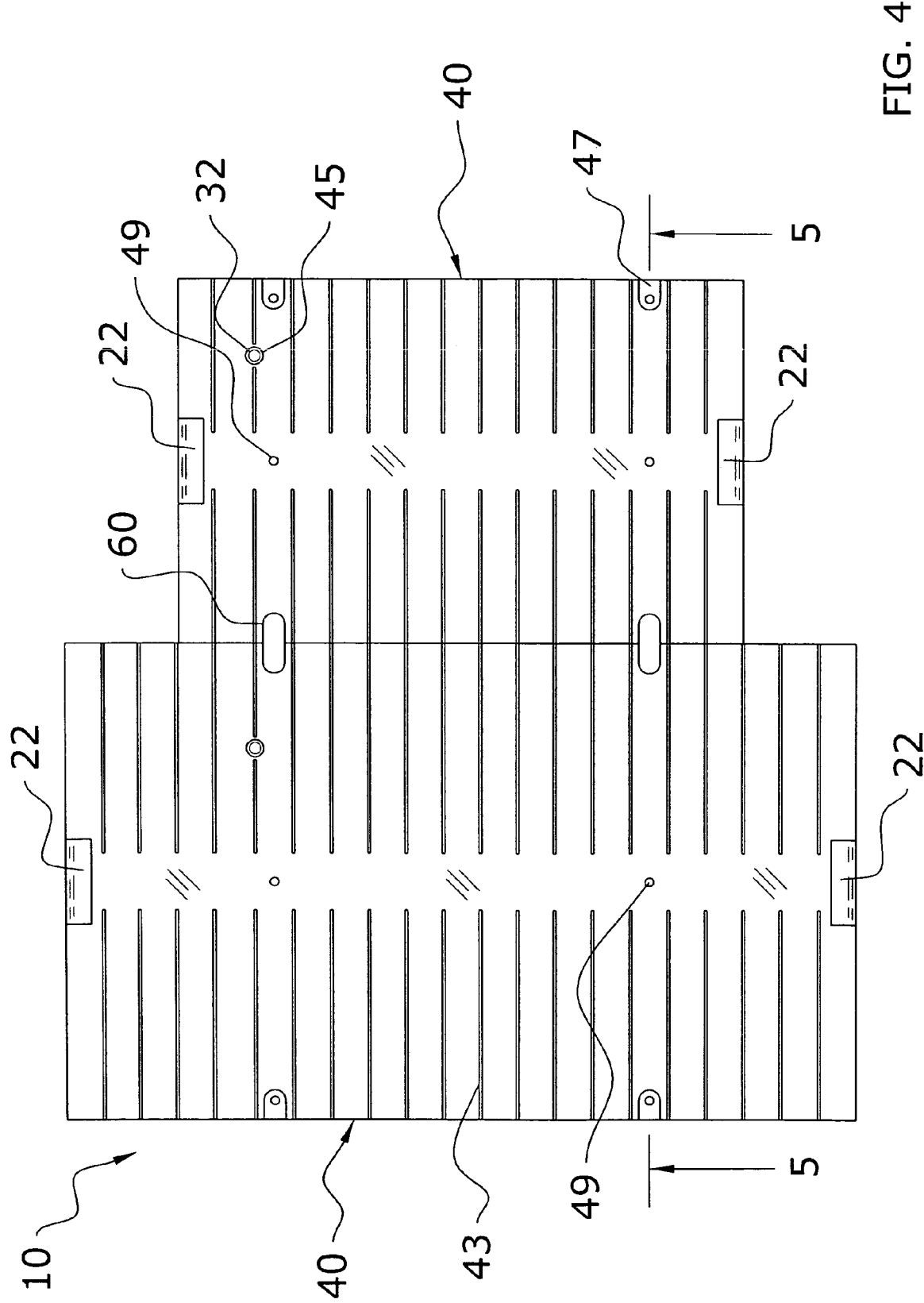
FIG. 4 is a top view of two present inventions linked together.

The base container 20 is preferably comprised of a square structure and configuration as illustrated in FIGS. 1 through 3. The base container 20 is also preferably comprised of a rigid plastic material; however other materials may be utilized to construct the base container 20. The base container 20 may be formed to a various number of sizes and configurations to fit various different vehicles.

The sizes and configurations of the base container 20 preferably match up with different configurations of pickup beds 12 as illustrated in FIGS. 9a through 9d. The total height of the base container 20 is preferably less than half a height of the height of the pickup bed 12 sidewalls. This allows the use of a pickup bed 12 cover (i.e. tonneau cover) while using multiple vehicle ballast systems 10.

The base container 20 is preferably formed to one piece, but may also be constructed with several different pieces (top, side, etc.). The base container 20 also includes a bottom surface, wherein the bottom surface is preferably comprised of a non-slip material. This helps to ensure that the base container 20 does not slide around the vehicle during vehicle operation.

On the bottom surface of the base container 20 there is preferably at least one lower pin aperture 28. The lower pin aperture 28 serves as an aperture to receive a stacking pin 62 while stacking several vehicle ballast systems 10 upon one another as illustrated in FIG. 3. The stacking pin 62 is preferably comprised of an elongated pin. The stacking pin 62 is preferably substantially similar to the length of the lower pin aperture 28 and an upper pin aperture 49 combined. The stacking pin 62 is also preferably comprised of a rustproof metal material.

The vehicle ballast system 10 also preferably includes a liner 24. The liner 24 is preferably of a similar configuration as the base container 20. The liner 24 is preferably formed to fit securely within the base container 20 so that the outer perimeter of the liner 24 is substantially similar or slightly less than the inner perimeter of the base container 20. The liner 24 is preferably a separate structure from the base container 20 to allow for removability of the liner 24 from the base container 20; however the liner 24 may be comprised of an integrally formed structure with the base container 20.

Figure 5:
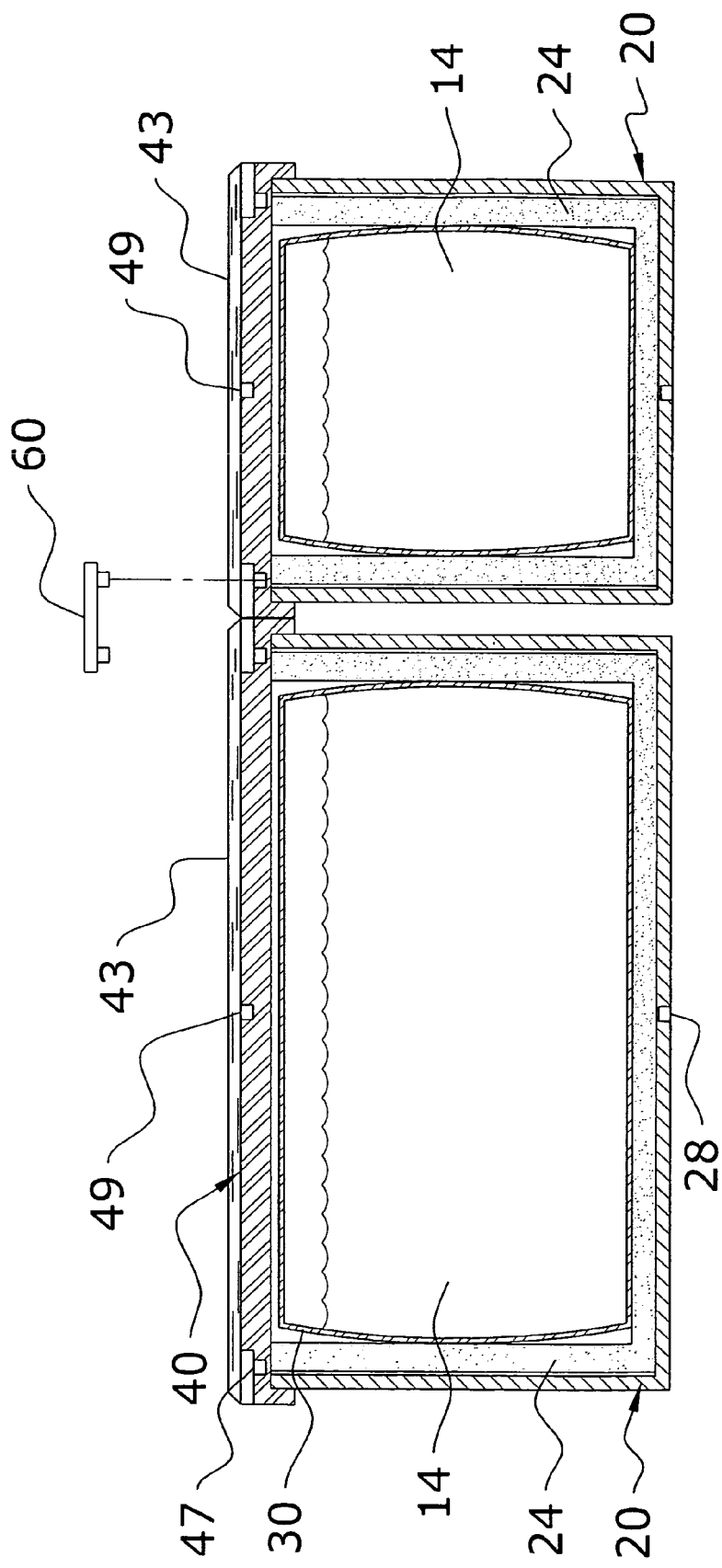
FIG. 5 is a sectional view taken along lines 5-5 of FIG. 4.

The liner 24 may be comprised of several different materials. If the bladder unit 30 is to be used with the vehicle ballast system 10, the liner 24 is preferably comprised of a foam or rubber material as illustrated in FIG. 5. This helps to ensure a soft or cushiony material for the bladder unit 30 to rest against.

Figure 10:
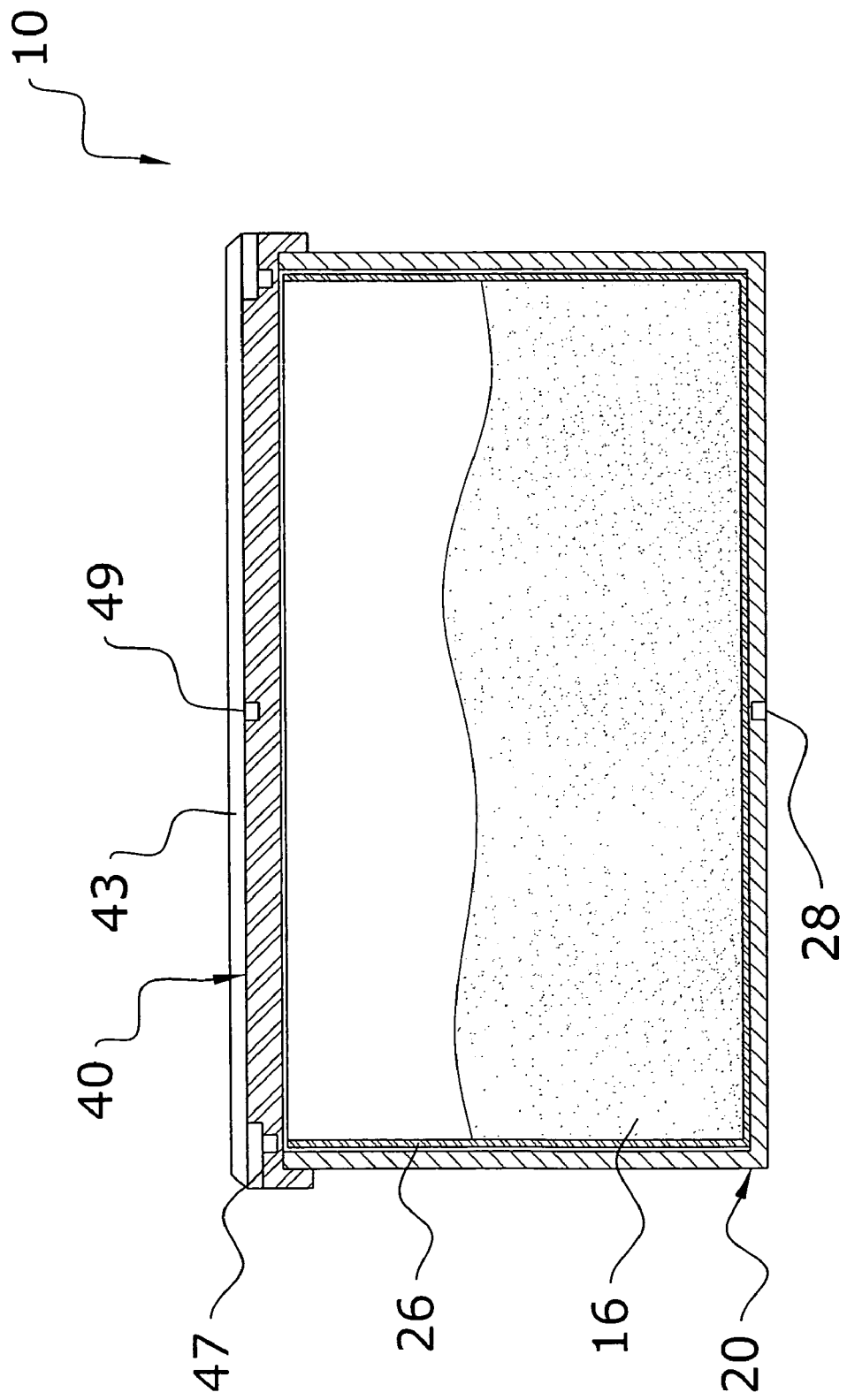
FIG. 10 is a cross sectional view of an alternate embodiment of the present invention.

If a substance such as solid substance 16 is used in place of the bladder unit 30, the liner 24 is preferably comprised of a more rigid material, such as but not limited to plastic as shown in FIG. 10. The solid substance may be comprised of, but is not limited to sand or salt. It is appreciated that the liner 24 may be comprised of several different materials not listed above, with what is listed above simply the preferred embodiment of the liner 24. The liner 24 may also be completely removed from the base container 20. An instance where the liner 24 may not be utilized is if the base container 20 is to be used merely as a storage container.

The base container 20 preferably includes a pair of clamps 22. The clamps 22 are preferably attached to opposing sides of the base container 20 as shown in FIGS. 1 through 3. The clamps 22 are also preferably hingedbly attached to the base container 20; however other suitable configuration methods may be used. When the clamps 22 are attached to the cover 40 they also serve as a pair of handles to allow for easier mobility of the vehicle ballast system 10.

C. Bladder Unit

The bladder unit 30 is preferably comprised of a structure and configuration to fit within the liner 24 as illustrated in FIGS. 2, 3 and 5. The bladder unit 30 may also be comprised of a structure and configuration to fit solely within the base container 20 if a liner 24 is not used. The bladder unit 30 is preferably comprised of a rigid plastic material, so as to withstand a wide range of temperatures and constant vehicle movement. The plastic material of the bladder unit 30 is also preferably comprised of polyvinyl chloride.

The bladder unit 30 is able to retain a volume of a liquid substance 14 as shown in FIG. 5. To receive and disperse the liquid substance 14, the bladder unit 30 preferably includes at least one nozzle 32. The nozzle 32 is preferably positioned on an upper side of the bladder unit 30 as illustrated in FIG. 2. The nozzle 32 of the bladder unit 30 serves to allow the liquid substance 14 into the bladder unit 30 and also serves as a port to remove the liquid substance 14 from the bladder unit 30.

D. Cover

The cover 40 is preferably comprised of a square structure and configuration as illustrated in FIGS. 1, 2, 4 and 7 through 9d. An outer perimeter of the cover 40 is preferably substantially similar to the outer perimeter of the base container 20 to provide a tight seal in-between the base container 20 and the cover 40.

The cover 40 preferably includes a pair of recessed portions (41). The recessed portions (41) preferably substantially match the position of the clamps 22 in relation from the base container 20 to the cover 40. The recessed portions (41) of the cover 40 preferably receive the clamps 22 of the base container 20 to seal the cover 40 against the base container 20 as shown in FIG. 3.

The cover 40 includes an upper surface. The upper surface of the cover 40 preferably includes a plurality of ribs 43 as illustrated in FIGS. 4 and 9a through 9d. The plurality of ribs 43 are preferably comprised of raised ridges. The plurality of ribs 43 preferably run parallel to each other and serve as a gripping surface for the cover 40 of the vehicle ballast system 10 and also to strengthen the cover 40. The upper surface of the cover 40 is also preferably comprised of a non-slip material.

The cover 40 preferably also includes an opening 45 as illustrated in FIGS. 4 and 9a through 9d. The opening 45 is preferably positioned directly over the nozzle 32 of the bladder unit 30 when the bladder unit 30 is in the vehicle ballast system 10. The opening 45 serves as an access point to the nozzle 32 to allow filling and dispersing of the liquid substance 14 without the cover 40 from the base container 20.

The cover 40 preferably includes a plurality of slots 47 as shown in FIGS. 1 through 4 and 7 through 9d. The slots 47 are preferably positioned substantially near or on the edges of the cover 40. The slots 47 are also preferably positioned in a substantially similar orientation regardless of the cover 40 or base container 20 size. This allows multiple slots 47 from multiple different covers 40 to align with each other.

Figure 9A:
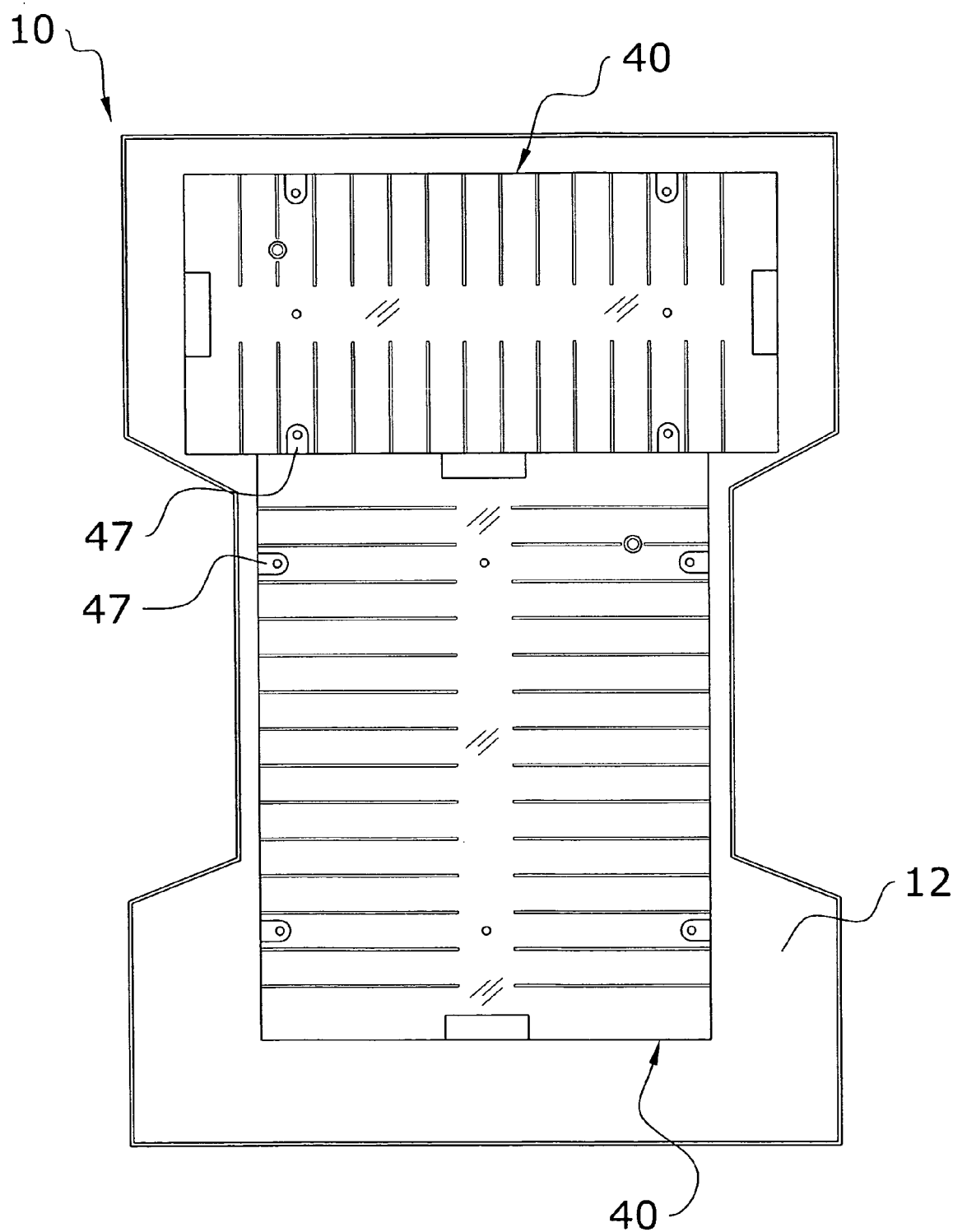
FIG. 9a is a top view of the present invention in a pickup box.
Figure 9B:
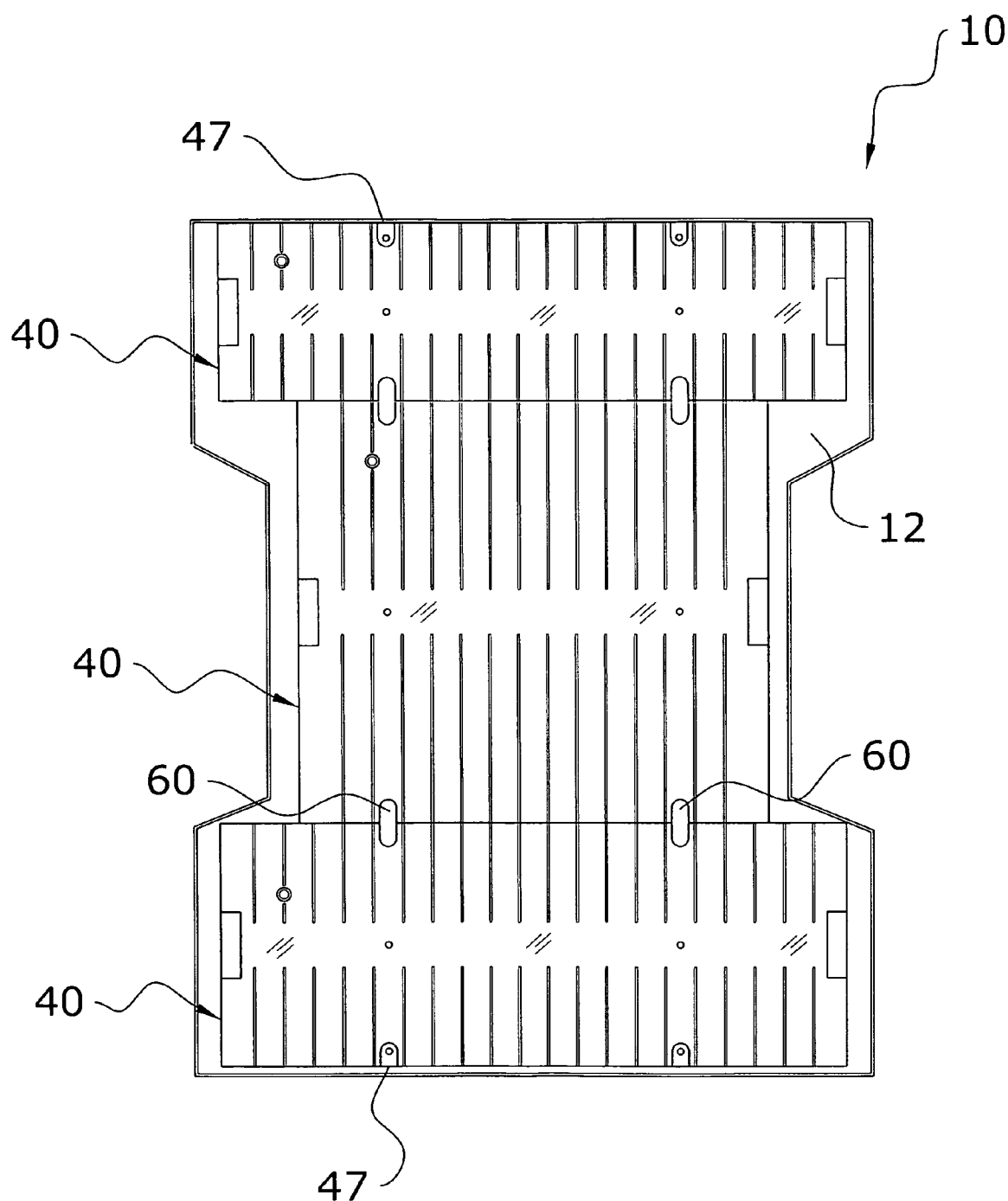
FIG. 9b is a top view of the present invention in a pickup box and in an alternate configuration.
Figure 9C:
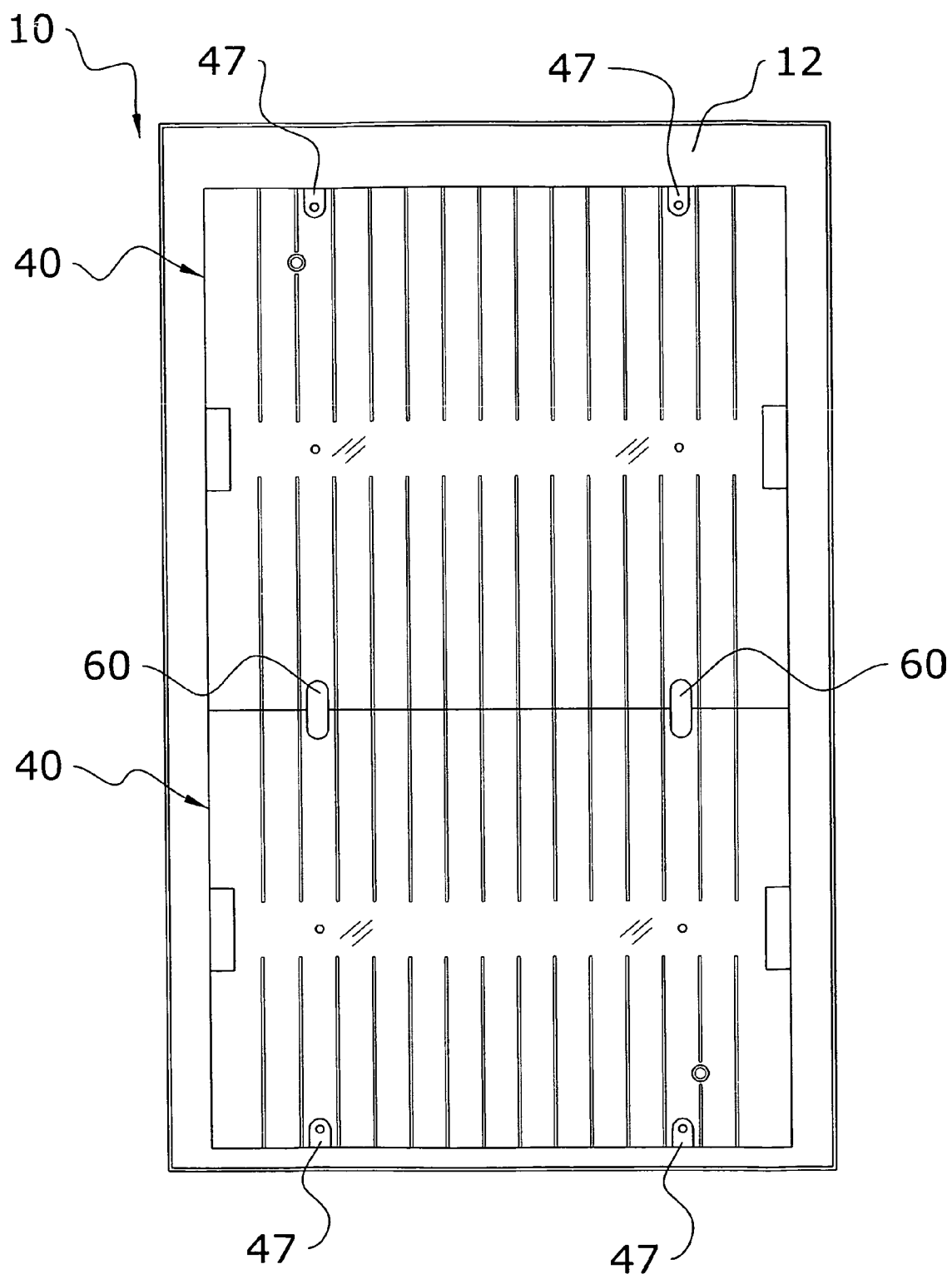
FIG. 9c is a top view of the present invention in a pickup box and in another alternate configuration.
Figure 9D:
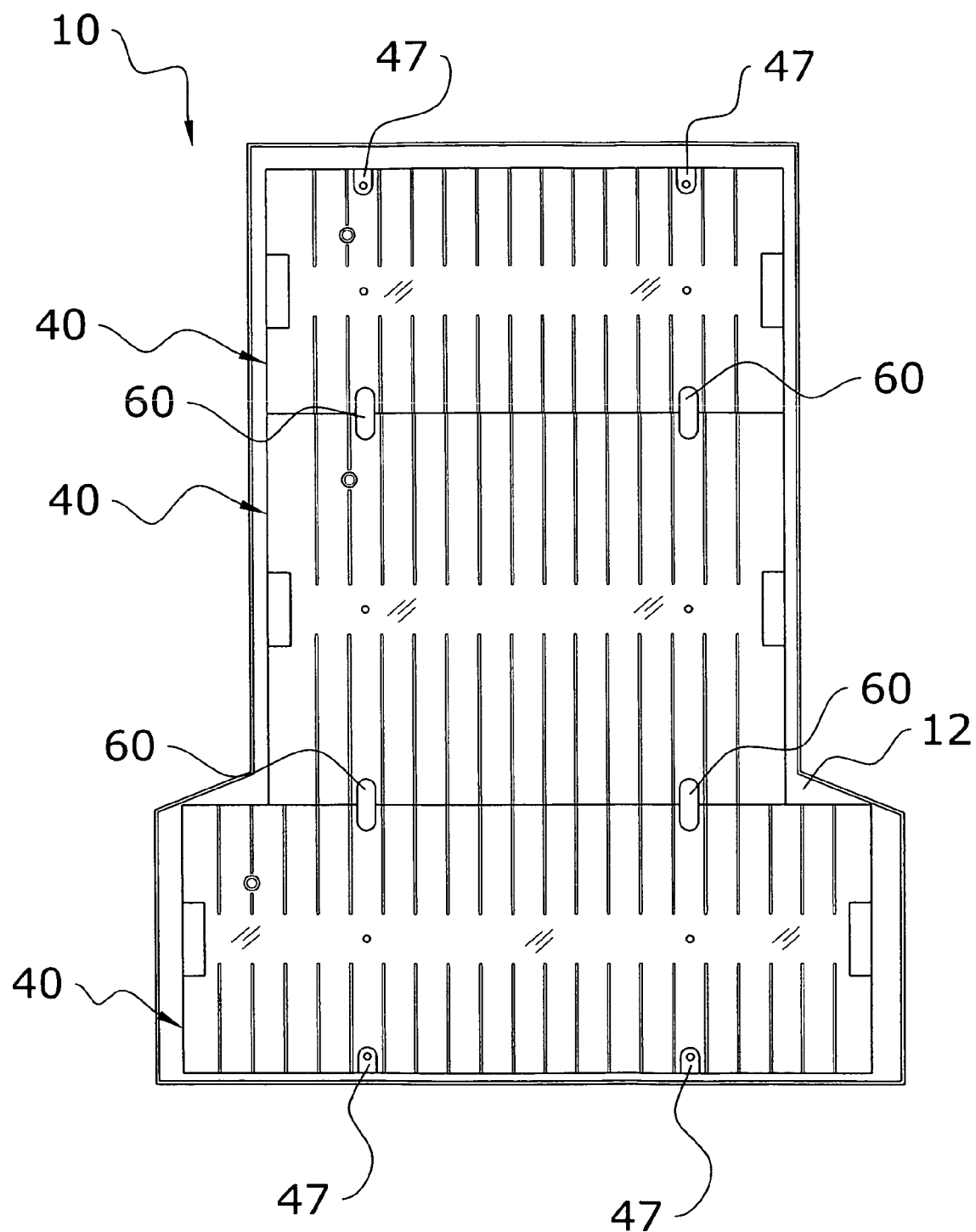
FIG. 9d is a top view of the present invention in a pickup box and in a further alternate configuration.

The slots 47 preferably receive a connecter clip 60 as illustrated in FIGS. 4 and 9a through 9d. A length of the connecter clip 60 is preferably comprised of at least two times the length of the slot 47. This allows the connecter clip 60 to connect two slots 47 from two different covers 40 as illustrated in FIGS. 9a and through 9d. The connector clip 60 is also preferably comprised of a rustproof metal material.

Figure 7:
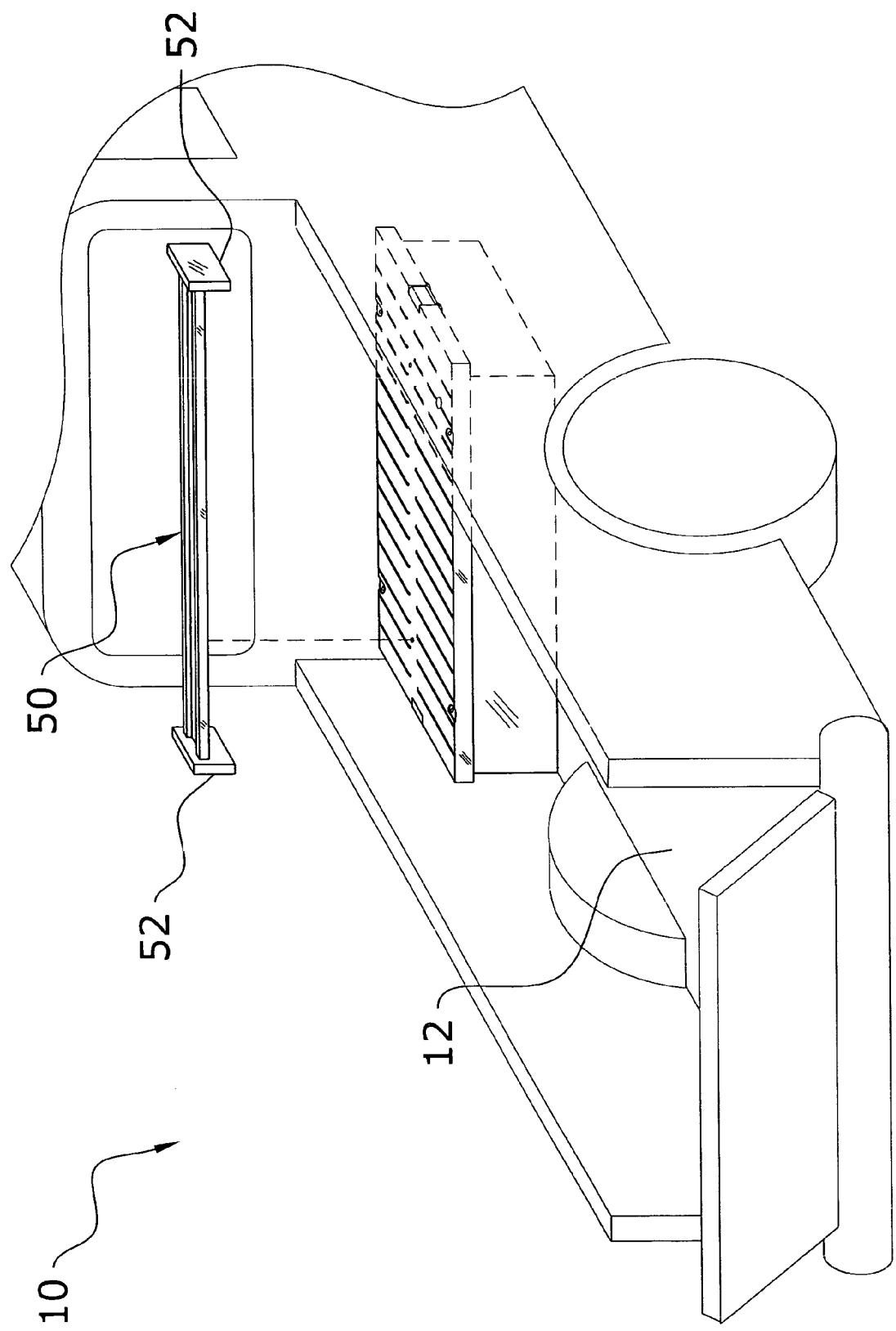
FIG. 7 is an exploded upper perspective view of the present invention in use.
Figure 8:
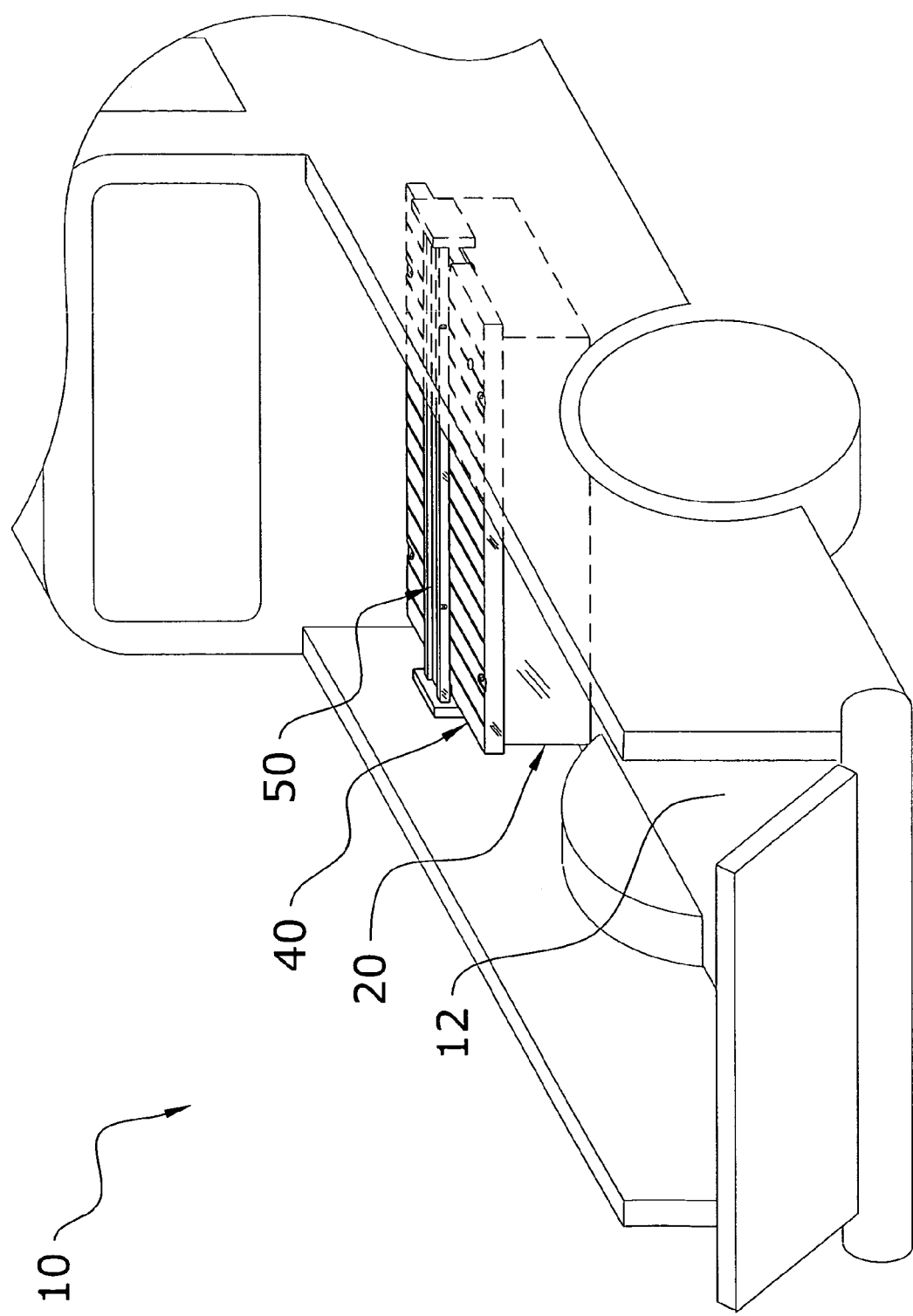
FIG. 8 is an upper perspective view of the present invention in use.

The cover 40 also preferably includes at least one upper pin aperture 49. The upper pin aperture 49 serves as an aperture to receive the opposing end of the stacking pin 62 as the lower pin aperture 28 while stacking several vehicle ballast systems 10 upon one another as illustrated in FIG. 3. The upper pin aperture 49 also serves to receive a pin member 56 from a stabilizing member 50, when the stabilizing member 50 is in use as shown in FIGS. 7 and 8.

E. Stabilizing Member

Figure 6:
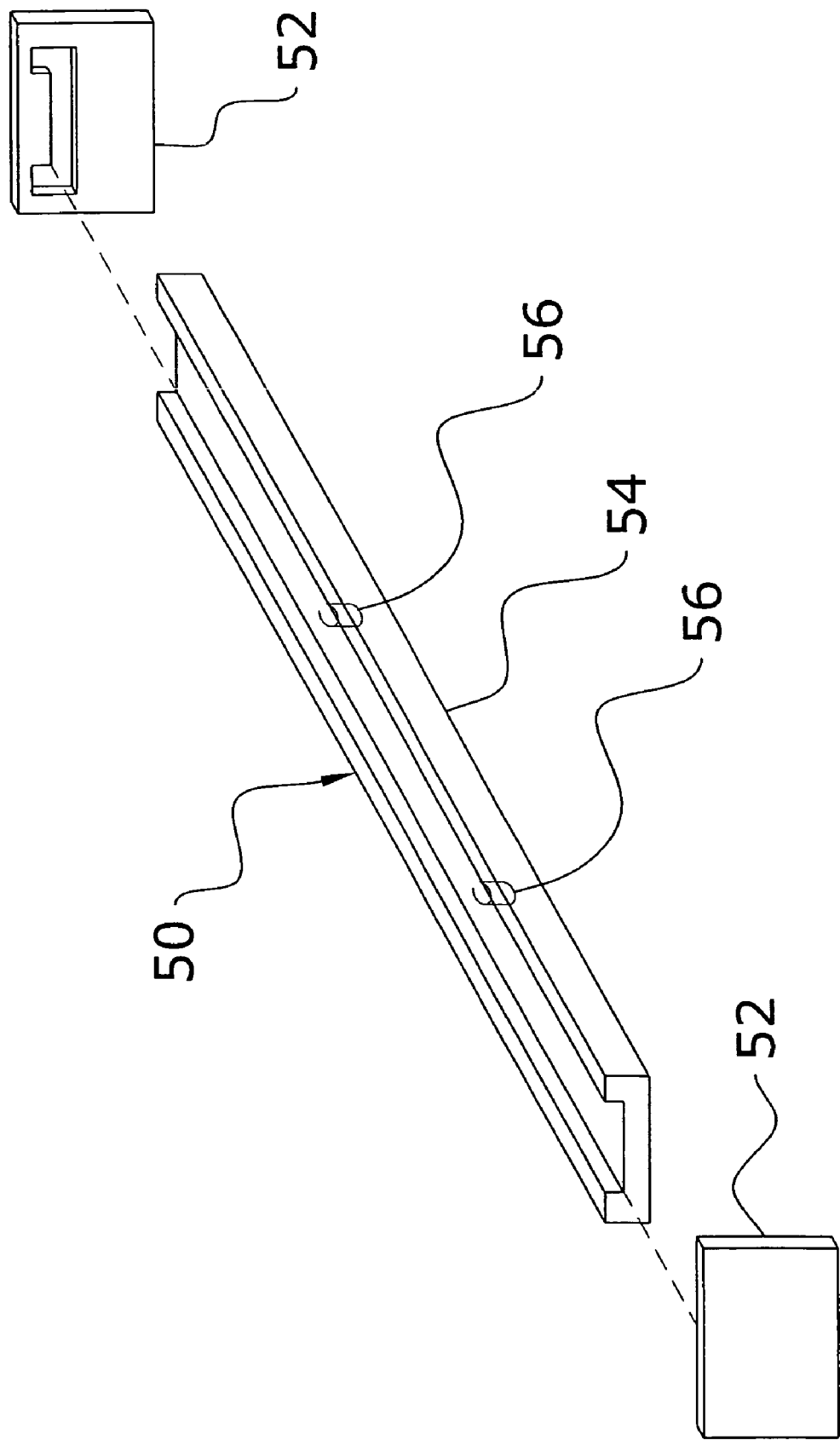
FIG. 6 is an exploded upper perspective view of the stabilizing member.

The stabilizing member 50 is preferably comprised of an elongated structure and configuration as shown in FIG. 6. The stabilizing member 50 is preferably comprised of a rustproof and metal material however other materials, such as but not limited to plastic can be used with the stabilizing member 50. The stabilizing member 50 preferably includes a cross member 54 as illustrated in FIG. 6.

The cross member 54 is preferably comprised of a channel structure and configuration; however the cross member 54 may be comprised of any other suitable different structures and configurations. The channel structure helps to increase the strength of the cross member 54. The cross member 54 is preferably comprised of a length substantially similar to the width of a pickup truck bed 12 as illustrated in FIGS. 7 and 8. The cross member 54 may also be trimmed to accommodate different size pickup truck beds 12.

The cross member 54 includes a first end and a second end. The first end and the second end are formed to fit within a pair of stabilizing ends 52 as shown in FIG. 6. The stabilizing ends 52 preferably proved a wider dispersal of any lateral weight shifting which may occur and keep the stabilizing member 60 from marring the pickup bed 12 sidewalls. The stabilizing ends 52 are preferably comprised of a square structure and configuration however other structures for the stabilizing ends 52 are acceptable.

The cross member 54 also preferably includes at least one pin member 56 as illustrated in FIG. 6. The pin member 56 preferably extends downwardly from the cross member 54. The pin member 56 is also preferably of an elongated structure and configuration. The pin member 56 is preferably of a size and configuration to be received by the upper pin aperture 49 of the cover 40. This helps to further stabilize the vehicle ballast system 10 from movement during vehicle use.

F. In Use

In use, the liner 24 is preferably positioned within the base container 20. If the liquid substance 14 is to be used as a weight apparatus, the bladder unit 30 is positioned in the liner 24, ensuing that the nozzle 32 is positioned at the top of the bladder unit 30. The cover 40 is then directed over the base container 20 so the opening 45 is positioned over the nozzle 32 of the bladder unit 30. The cover 40 may now be attached to the base container 20 via the clamps 22.

If a solid substance 16 is to be used as a weight apparatus the bladder unit 30 is preferably not used. The cover 40 is left removed from the base container 20 until the base container 20 and liner 24 are positioned in the vehicle or pickup bed 12. If using a solid substance 16 as the weight substitute the user should ensure to use the plastic material liner 24 rather than the foam liner 24 with the base container 20.

The vehicle ballast system 10 is now picked up, using the clamps 22 as handles, and oriented on the pickup bed 12 as desired. The vehicle ballast system 10 is preferably positioned near the wheel wells of the vehicle to provide added weight directly over the tires. If more weight is desired, the user may setup additional vehicle ballast systems 10 and arrange them in the vehicle as desired. If more than one vertical row of vehicle ballast systems 10 is desired, the first row must be filled with a weight substance (i.e. liquid substance 14, salt, sand, etc.) before adding a second row.

If the user is using the liquid substance 14 as the weight substitute and multiple vehicle ballast systems 10, the user may connect the multiple covers 40 using connecting clips as shown in FIGS. 9a through 9d. Once all the connecter clips 60 are in place or no more connecter clips 60 are needed, the bladder units 30 may be filled with the liquid substance 14 by inserting a hose or other liquid dispenser into the nozzle 32 through the opening 45 of the cover 40. The bladder unit 30 is now filled to a desired amount.

If the user is using the solid substance 16 as a weight substitute the liners 24 may now be filled with the desired substance, preferably not exceeding the top of the liner 24. Once the liner 24 is filled to a desired level, the cover 40 is attached to the base container 20 and any connecter clips 60 needed for multiple vehicle ballast systems 10 are put in place.

The second row, if desired, may now be arranged and filled upon the first row using the same method described previously. The user should ensure to insert a stacking pin 62 in-between the different rows of the vehicle ballast systems 10. The stacking pin 62 is inserted in the upper pin aperture 49 of the first row cover 40 and the opposing end of the stacking pin 62 is inserted into the lower pin aperture 28 of the second row base container 20.

The stabilizing member 50 may now be positioned over the cover 40 of the top row of vehicle ballast systems 10. The cross member 54 is first measured and cut to substantially equal the width of the pickup bed 12. The stabilizing ends 52 are now placed on the first end and the second end of the cross member 54.

The stabilizing member 50 is now put in place, ensuring that the pin members 56 of the cross member 54 are inserted into the upper pin aperture 49 of the cover 40. A separate stabilizing member 50 may be used for each column of vehicle ballast systems 10. The vehicle ballast system 10 is now in place. To disassemble the vehicle ballast system 10 the above process is simply reversed.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:
1. A pickup truck having a pickup truck bed,
a vehicle ballast system, comprising:
a base container;
a bladder unit including a nozzle, wherein said bladder unit is removably positioned within said base container and wherein said bladder unit is to retain a volume of a liquid substance; and
a cover removably attached to an upper end of said base container,
a stabilizing member including a first end and a second end; wherein said stabilizing member is substantially similar in length to the width of a pickup truck bed; and
a pair of stabilizing ends each removably positioned on said first end and said second end; and
wherein said stabilizing member includes at least one pin member,
wherein said pin member is removably attached to an upper pin aperture of said cover.
2. The vehicle ballast system of claim 1, including:
a liner removably positioned within said base container;
wherein said bladder is removably positioned within said liner.
3. The vehicle ballast system of claim 2, wherein said liner is comprised of a foam liner.

4. The vehicle ballast system of claim 1, wherein said base container includes a pair of clamps hinged by attached to opposing sides of said base container.
5. The vehicle ballast system of claim 4, wherein said cover includes a pair of recessed portions to receive said pair of clamps of said base container.
6. The vehicle ballast system of claim 1, wherein said cover includes an opening position over said nozzle of said bladder unit.
7. The vehicle ballast system of claim 1, wherein said cover includes a plurality of ribs.
8. The vehicle ballast system of claim 1, wherein said cover includes at least one slot to receive a connecting pin.
9. The vehicle ballast system of claim 8, wherein said at least one slot is positioned near an outer edge of said cover.
10. The vehicle ballast system of claim 1, wherein said base container includes a bottom surface, wherein said bottom surface includes a lower pin aperture to receive a first end of a stacking pin, wherein an opposing end of said stacking pin is received by an upper pin aperture of said cover.
11. The vehicle ballast system of claim 1, wherein said base container includes a bottom surface, wherein said bottom surface is comprised of a non-slip surface material.
12. A vehicle ballast system, comprising:
a base container including a bottom surface and a pair of clamps hinged by attached to opposing sides of said base container;
wherein said bottom surface is comprised of a non-slip material;
a liner removably positioned within said base container, wherein said liner is comprised of a plastic material;
wherein said liner is to retain a volume of a solid substance; and
a cover including a pair of recessed portions to receive said pair of clamps of said base container;
wherein said cover includes a plurality of ribs;
a stabilizing member including a first end and a second end;
wherein said stabilizing member is substantially similar in length to the width of a pickup truck bed; and
a pair of stabilizing ends each removably positioned on said first end and said second end;
wherein said stabilizing member includes at least one pin member;
wherein said pin member removably attaches to an upper pin aperture of said cover.
13. A vehicle ballast system, comprising:
at least one base container including a bottom surface and a pair of clamps hinged by attached to opposing sides of said at least one base container;
wherein said bottom surface is comprised of a non-slip material;
a liner removably positioned within said at least one base container, wherein said liner is comprised of a foam material;
a bladder unit including a nozzle, wherein said bladder unit is removably positioned within said liner and wherein said bladder unit is to retain a volume of a liquid substance;
a cover including a pair of recessed portions to receive said pair of clamps of said at least one base container;
wherein said cover includes a plurality of ribs;
wherein said cover includes an upper pin aperture;
a stabilizing member including a first end and a second end, wherein said stabilizing member is substantially similar in length to the width of a pickup truck bed;

a pair of a pair of stabilizing ends each removably positioned on said first end and said second end;

wherein said stabilizing member includes at least one pin member;

wherein said at least one pin member removably attaches to said upper pin aperture of said cover;

wherein said cover includes at least one slot; and a connecting pin removably attached to said at least one slot, wherein said connecting pin removably connects two said covers.

14. The vehicle ballast system of claim 13, wherein said bladder unit is comprised of a plastic material.

* * * * *